United States Patent
Miedema et al.

(10) Patent No.: US 7,282,110 B2
(45) Date of Patent: Oct. 16, 2007

(54) METHOD OF MAKING AN ENDLESS IMAGE-FORMING MEDIUM

(75) Inventors: Mark Miedema, Velden (NL); Reinier H. Wieringa, Grubbenvorst (NL); Robert N. J. Jacobs, Maasbree (NL); Robert Link, Munich (DE)

(73) Assignee: OCE-Technologies B.V., Venlo (NL)

( * ) Notice: Subject to any disclaimer, the term of this patent is extended or adjusted under 35 U.S.C. 154(b) by 262 days.

(21) Appl. No.: 11/033,278

(22) Filed: Jan. 12, 2005

(65) Prior Publication Data
US 2005/0150931 A1    Jul. 14, 2005

(30) Foreign Application Priority Data
Jan. 14, 2004    (NL) ................... 1025243

(51) Int. Cl.
*B32B 37/00*    (2006.01)
(52) U.S. Cl. ............... 156/308.2; 156/218; 156/229; 156/304.1; 430/127
(58) Field of Classification Search ........... 156/217, 156/218, 229, 308.2, 304.1; 430/427, 130, 430/133, 127
See application file for complete search history.

(56) References Cited

U.S. PATENT DOCUMENTS

| | | | |
|---|---|---|---|
| 3,595,836 A * | 7/1971 | Korneli et al. ........... 528/308.2 |
| 4,006,019 A | 2/1977 | Karam | |
| 4,033,768 A | 7/1977 | Wieloch | |
| 5,021,109 A | 6/1991 | Petropoulos et al. | |
| 5,240,532 A | 8/1993 | Yu | |
| 5,413,810 A * | 5/1995 | Mastalski ............. 427/171 |
| 5,885,512 A | 3/1999 | Yu et al. | |
| 6,068,722 A | 5/2000 | Yu et al. | |
| 6,232,028 B1 | 5/2001 | Landa et al. | |

FOREIGN PATENT DOCUMENTS

GB    1 493 529    11/1977

* cited by examiner

*Primary Examiner*—John L. Goff
(74) *Attorney, Agent, or Firm*—Birch, Stewart, Kolasch & Birch, LLP

(57) ABSTRACT

A method of making an endless image-forming medium starting from a strip of semi-crystalline support material, which strip extends between a first and second end, wherein the ends of the strip are brought together and fused to form an endless support, and the fused ends are post-crystallized, wherein prior to the application of the image-forming layer to the support at least a portion of the support is stretched, and the stretched part of the support is heated to a temperature above the glass transition temperature of the support material.

9 Claims, 4 Drawing Sheets

METHOD OF MAKING AN ENDLESS IMAGE-FORMING MEDIUM

This non-provisional application claims priority under 35 U.S.C. § 119(a) on Patent Application No. 1025243 filed in The Netherlands on Jan. 14, 2004, which is herein incorporated by reference.

BACKGROUND OF THE INVENTION

The present invention relates to a method of making an endless image-forming medium starting from a strip of semi-crystalline support material which strip extends between a first and second end, wherein the first and second ends are brought together and fused to form an endless support. The fused parts are post-crystallized and an image-forming layer is applied to the support.

Such a method is known from the international patent application WO 03/028982 and can be used, for example, as described in this application for forming a photoconductor for use in a printer. In this method, a strip of semi-crystalline support material is used as starting material, i.e. a material which is partially crystalline and partially amorphous such as, for example, the semi-crystalline polyester described therein. In this method, the head edges of the ends of the strip of support material are positioned against one another. The two ends are then fused together forming a weld. In the known method, the strip is heated to a temperature above the melting temperature of the material from which the strip is formed using radiation at the required weld location. As a result the ends of the strip are fused together. However, after fusing, the support material is significantly amorphous and thus a weak weld is formed. Also, tension is built up in the endless support. To make the weld sufficiently stronger and to reduce the problem of tension, the weld is treated so that the amorphous material at least partially re-crystallizes. In this connection, it is not necessary to achieve the same degree or form of crystallization as that of the original starting material. In one embodiment, and for this purpose, the weld is heated to a temperature where it does not melt but where the molecules of the molten material still have sufficient freedom of movement to be oriented with respect to one another, whereby the support material post-crystallizes and obtains a higher degree of crystallization at the weld location. In another embodiment, directly after the fusion of the two ends, the weld is slowly cooled so that the melted amorphous material has the opportunity to crystallize.

If an image-forming layer is applied to the endless support obtained in this way, an endless image-forming medium can be obtained which has no loss of image-forming functionality at the weld location. The advantage of this is that during image formation, no consideration need be paid to the location of the weld.

An important disadvantage of the known process is that the efficiency is relatively low. Although it is possible to obtain image media which have the same functionality at the location of the fused parts (hereinafter referred to as "the weld" in this description) as at any other location of the belt, the majority of the image media, that is, up to some 70%, has been found to exhibit considerably deviating functionality at this location. This deviating functionality takes the form, for example, in the occurrence of a stripe in the image at the place corresponding to the weld. Although the reason for this is not completely clear, it appears to be connected with defects in the image-forming layer at the weld location.

The purpose of the present invention is to provide a method having better efficiency. Thus, according to the present invention, prior to the application of the image-forming layer, at least a part of the support containing the fused parts is stretched, and the stretched part of the support is heated to a temperature above the glass transition point of the support material.

It has been surprisingly found that thermal treatment of the endless support, during which at least a part of the belt around said weld is under tension, enables the efficiency of the method to be significantly improved. By the application of this method it has been found possible to reduce the loss to 20% or less. It has been found that this treatment of the support should take place before the actual image-forming layer is applied to the support. To obtain the effect of the present invention, it is not important how much time elapses between the treatment of the support and the application of the image-forming layer or whether there are additional process steps therebetween.

Moreover, the favorable effect of the present invention does not appear to be due to the removal of any tension built up in the weld by the recrystallization process. On the one hand, the above-mentioned international application teaches that any tension build-up can be avoided precisely by recrystallization. On the other hand, in the method according to the present invention it is important that the temperature at which the endless support should be after-treated is above the temperature at which the initial support material has its glass transition point. If there is any tension in the weld, it would be precisely expected that a temperature above the glass transition point of the recrystallized weld material, which is typically 5 to 10° C. lower than that of the starting support material, should be sufficient. Also, the glass transition point of the support material can be determined, for example, in a method as known from the handbook *Thermal Analysis* by Bernhard Wunderlich, 1990, page 101 et seq. In the light of the present invention, the term glass transition point does not mean one temperature but all temperatures in the range of the glass transition point (described by Wunderlich on page 101, line 18, as "range of the glass transition"). The present invention can be applied at a temperature above the start of the transition (referred to as "$T_b$" by Wunderlich). The range of the glass transition point can be determined at different cooling (or heating) rates. Preferably, a very low rate is used, for example 1° C./min, particularly using a differential scanning calorimeter (DSC).

It should also be noted that the tension applied need have only a minimum value. It has been found that the present invention can be successfully used if the endless support is stretched at a tension not equal to zero, i.e. greater than zero. It should also be noted that the present invention is not restricted to a photoconductive layer as the image-forming layer. In principle the invention can be successfully applied to obtain a support for any layer on which an image can be formed. Nor is the invention restricted to obtaining a weld using a heat source to fuse the two ends. In principle, any technique leading to a comparable result can be used in the present invention.

From U.S. Pat. Nos. 5,885,512 and 6,068,722 it is known to thermally treat an endless photoconductor having a weld, the photoconductor being kept at a certain tension. The after-treatment known from this is not aimed at obtaining a higher percentage of photoconductors which initially have a good image-forming functionality at the weld location, but to withstand mechanical ageing of the photoconductor at the weld location. The processes known from this propose to subject the photoconductor to thermal after-treatment as a whole, i.e. including the image-forming layer. This after-treatment is aimed at removing internal tensions forming due to the application of different layers to one another. The present invention has realized that this known method does not provide the required improvement in production efficiency.

From U.S. Pat. No. 6,232,028 there is also known a method in which a photoconductor is subjected to tension at least in respect of a part and its temperature at the same time temporarily increased. This patent states that it is advantageous to select the temperature of the after-treatment which is below the glass transition point of the support.

In one embodiment of the present invention, after heating above the glass transition point and before the application of the image-forming layer the support material is cooled to a temperature below the glass transition point of the support material. As a result, the new state obtained is consolidated and the endless support can be mechanically treated without having an adverse effect on the production process. The result is greater freedom in the production process. Thus a support can be temporarily maintained before the image-forming layer is actually applied.

In another embodiment, the entire support is stretched. This embodiment has the advantage that the tension required can be easily obtained, for example by stretching the support over one or more rollers. This avoids the need to grip the surface of the support in order to stretch it. This might cause soiling or damage of the surface and this can, in turn, affect the functionality of the required image-forming medium. Also, apart from reducing the incidence of damage or soiling of the support as described above, it appears possible to further improve the production efficiency using this embodiment. The reason for this is not completely clear.

In another embodiment, the support is stretched over a drum having a radius slightly greater than the length L of the strip divided by $2\pi$. In this embodiment, the support is stretched over one drum only, which has a periphery somewhat greater than the length of the endless support, typically up to 1%, and in one embodiment up to 0.15% greater. As a result, the support is as it were stretched over the drum by itself. This is a simplification of the method and consequently gives less rise to production defects.

In a further embodiment, the support is heated to a temperature above the glass transition point by placing it in an oven and on the drum on which the support is applied. This method on the one hand has the advantage that heating can be carried out very simply. On the other hand there is the advantage that as a result of the expansion of the drum the tension in the support can increase. This creates the possibility of keeping the initial tension at a minimum when the support is applied to the drum. The advantage of this is that the application of the support to the drum can take place with simple means and the risk of tearing when applying the support, particularly at the weld location, is very restricted.

In one embodiment, the image-forming layer is applied in the form of a solution, whereafter the solvent is evaporated. It has been found that precisely in this embodiment the maximum increase in production efficiency can be obtained. The reason for this is not clear.

In one embodiment the image-forming layer comprises a metal layer applied to the surface of the endless support. It is precisely with an image-forming medium of this kind that a deviant image-forming functionality was obtained at the weld location when using a method as known from the prior art. By the application of the method according to the present invention this can be significantly obviated.

In one embodiment, a polyester is used as the support material. The advantage of this material is that it is very resistant to water vapour and organic solvents. It also appears to be very suitable for use in the present invention.

In another embodiment, MELINEX is used as support material. This is a biaxially oriented polyester (polyethylene terephthalate) film made by DuPont/Teijin. This film appears particularly suitable for use in the method according to the present invention.

BRIEF DESCRIPTION OF THE DRAWINGS

The present invention will now be explained further with reference to the following drawings, wherein.

DETAILED DESCRIPTION OF THE INVENTION

Figure 1:
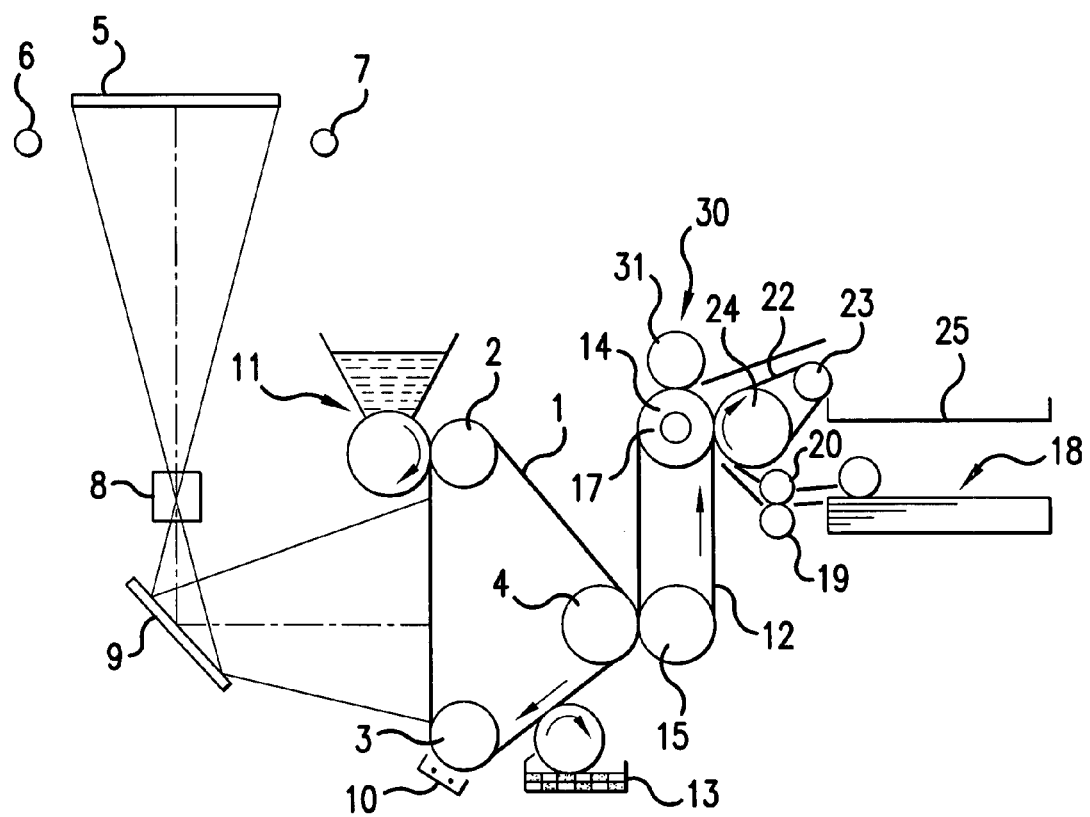
FIG. 1 is a diagram of an image-forming device.

The image-forming device shown in FIG. 1 is provided with an endless image-forming medium 1, in this case a chargeable belt with photoconductive properties which is advanced at a uniform speed by means of drive and guide rollers 2, 3 and 4 respectively. The image of an original placed on a window 5 is projected on to the medium 1 by means of flash lamps 6 and 7, a lens 8 and a mirror 9, after the medium 1 has been electrostatically charged by a corona device 10. Thus a latent charge image is obtained on medium 1. In another embodiment, the charge image is formed by using a scanning light source, for example as known from raster output scanners or LED-bar printers. The latter light sources are frequently used in digital printers. The latent charge image formed after the exposure is developed with a magnetic brush device 11 using toner powder to form a toner image which is then brought into contact, under pressure, with an endless intermediate medium belt 12 in a first transfer zone, said belt 12 being provided with a top layer of soft elastic and heat-resistant material, such as, for example, silicone rubber, as known from European Patent 0 349 072. The toner image is transferred by adhesion forces from medium 1 to the belt 12. In this way an image is formed on said intermediate medium. After this image transfer, any image residues remaining are removed from medium 1 by means of a cleaning device 13, whereafter the photoconductive medium 1 is ready for re-use.

The intermediate medium belt 12 is trained over drive and guide rollers 14, 15, the intermediate medium belt 12 being heated to a temperature above the toner powder softening temperature, for example by means of an infrared emitter 17 disposed inside roller 14. While belt 12 with the toner image thereon is advanced, the toner image becomes sticky as a result of the heating. In a second transfer zone the sticky toner image is then transferred under pressure by means of a pressure means in the form of a belt 22 trained over rollers 23 and 24, and at the same time fixed, on a sheet of receiving material fed from reservoir 18 via rollers 19, 20. Finally, the copy obtained in this way is deposited in delivery tray 25 by belt 22 which is trained over rollers 23 and 24.

Figure 2:
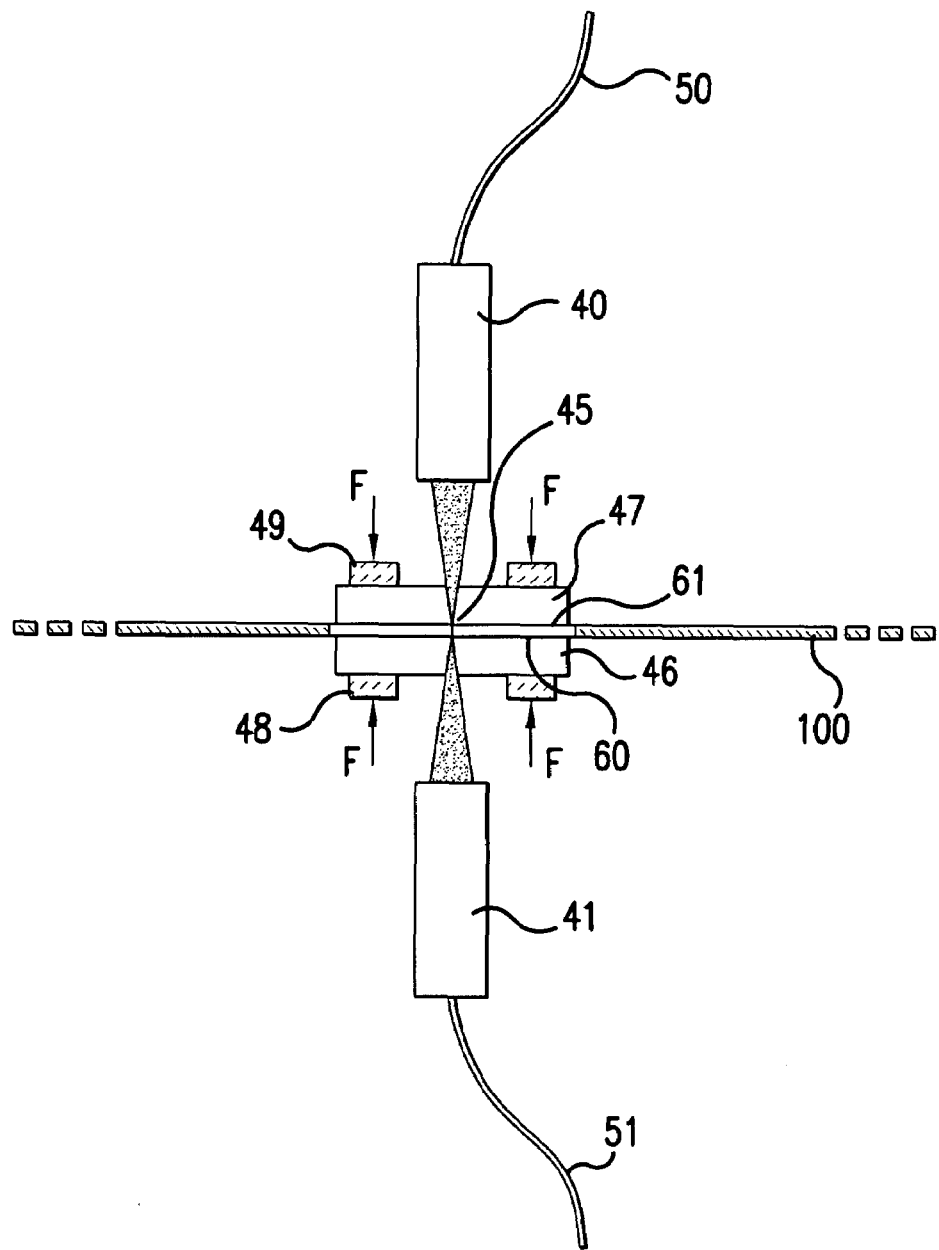
FIG. 2 diagrammatically shows an arrangement for welding a strip of support material.

FIG. 2 is a diagram showing the welding of a strip of support material, as known from WO 03/028982, particularly page 5, line 4, to page 13, line 21 of this publication, where the details of this process are described in detail. A short description of the known process will be given below. The FIG. shows a strip of MELINEX foil 100 disposed in an arrangement for welding together two ends of this strip. Two opposite ends of the strip are applied with their head edges against one another at location 45. These ends, and the area therearound, are enclosed between two glass plates 46 and 47. These plates are pressed against the foil by pressure-application means 48 and 49 so that the mutual distance between the plates is, at all times, equal to the thickness of the foil itself.

In this embodiment, the ends of the strip 100 are welded together by means of a laser light which is fed to the arrangement via laser radiation guide wires 50 and 51. In order to melt the material of the foil at location 45, the laser rays are focused by optical system 40 and 41 on the transition zone between the two ends. A laser-light-absorbing coating is optionally applied to the surfaces 60 and 61 to provide an adequate heat evolution in the foil.

After the ends of the strip 100 have melted, they flow into one another and a weld forms which is amorphous. This weld is treated in such a manner that the support material crystallizes at the location of the weld. For this purpose, an amorphous weld that has cooled in the meantime can be heated to a temperature at which the molecules in the foil are sufficiently mobile to re-crystallize, but not so mobile that the material again passes over to the melt. Typically, a temperature is selected which is a few degrees below the melting temperature of the material. Heating of the weld to this temperature can be effected by irradiating the weld with laser light from the laser sources 50 and 51 referred to above. In the manner described above it is thus possible to obtain an endless support suitable for forming an endless image-forming medium. In a particular embodiment of the present invention the ends of the initially amorphous weld, i.e. those parts of the weld that coincide with the edges of the newly formed belt, are not treated to become crystalline. Instead, these ends remain amorphous. It appears that in this way the local resistance against mechanical damage of the weld is increased significantly.

Figure 3:
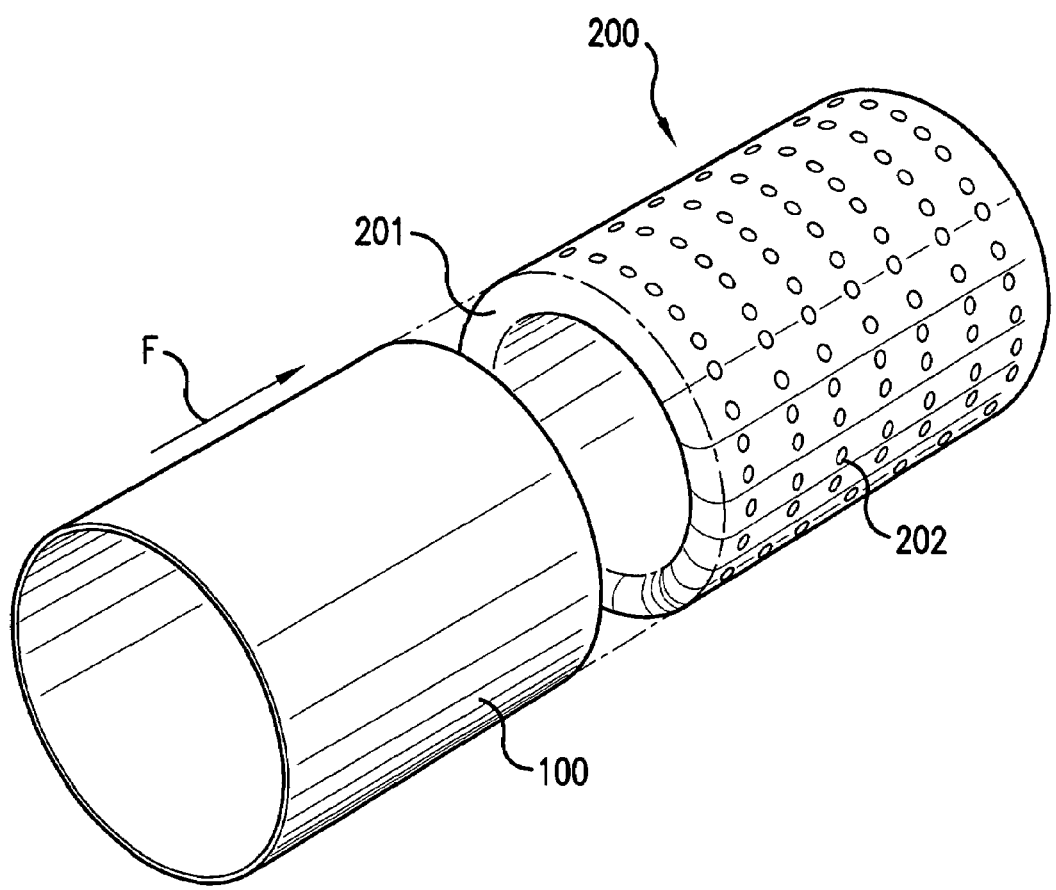
FIG. 3 shows an arrangement for treating an endless support.

FIG. 3 shows an endless support 100 obtained by the use of the welding process as described with reference to FIG. 2. This support is formed from a strip of MELINEX having a thickness of 150 mm, a width of 35 cm and a length of 1200.0 mm. Since, in the welding process according to this embodiment, the head edges of the ends of the strip are applied against one another, the endless support 100 has the same length. The glass transition point of the MELINEX used is at a temperature of 80° C.

In order to treat this endless support according to the present invention, before an image-forming layer is applied thereto, it is pushed over drum 200. This drum has a wall 201 of aluminium which is 15 mm thick, which forms a circular peripheral edge. The diameter of the drum is 382.00 mm and the length is 50 cm. The diameter is so selected that the support 100 fits on the drum 200 with a small stretch tension. In order to simplify the mounting of the belt over the drum, one end of the drum is tapered somewhat. In this way the belt can easily be pushed over that end of the drum in the direction F as indicated in the drawing. In order to simplify the further pushing of the support over the drum, air is blown through the holes 202 using a pump (not shown). By means of this air the support is stretched some tens of millimeters so that it has an inside diameter which is slightly greater than 382.0 mm. In this way the support can readily be pushed over the drum. When the support has been completely pushed over the drum the pump is switched off so that the support shrinks again and encloses the drum. The support is then cleaned, for example with a solvent. After cleaning, the drum is placed in an oven maintained at a temperature of 85° C. This oven contains a fan to circulate the air. As a result of the heating of the arrangement, the drum wall 201 expands more than the support 100 and in this way the stretch tension in the support will increase further. After the drum together with the support has been brought to this temperature, this situation is maintained for 15 minutes. The drum is then removed from the oven in order to cool in an unforced manner to room temperature. The entire process takes place under low-dust conditions to avoid soiling of the support as far as possible.

Figure 4:
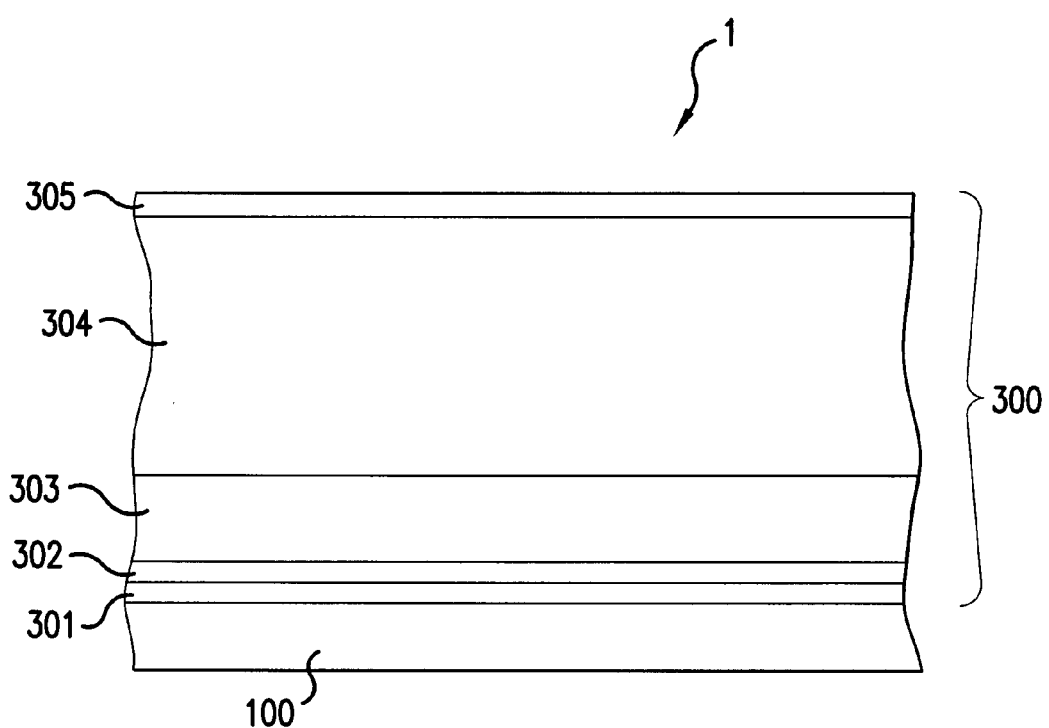
FIG. 4 is a diagram showing the construction of an image-forming medium.

FIG. 4 is a diagram showing the construction of the image-forming medium 1. The drawing shows part of a cross-section of a medium of this kind. An image-forming layer 300 built up from sub-layers 301 to 305 is applied to the support 100. Sub-layer 301 is a titanium layer 50 nm thick which can be applied to the support by means of a sputtering process. An adhesive layer 302, which is 100 nm thick is applied to this metal layer by means of a spray coat process. In the example illustrated, this adhesive layer comprises DYNAPOL, which is a commercially available polyester. This layer is cleaned by blowing away any impurities with air. A generation layer 303 is applied to the adhesive layer and contains a pigment which can absorb light while releasing free charge carriers. Pigments of this kind are sufficiently known from the prior art, for example, U.S. Pat. No. 4,587,189. In this example, the generation layer has a thickness of 500 nm. After the application of the generation layer, the transport layer 304 is applied. A layer of this kind and its application are sufficiently known from the prior art, for example as described in Example III of the above-mentioned U.S. Pat. No. 4,587,189. Further details of that process are also described in that patent specification. Finally, a protective layer 305 is applied, in this example an amorphous carbon layer, with a thickness of 150 nm. This layer reduces the mechanical wear of the image-forming medium when used in the process as shown in FIG. 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making an endless image-forming medium which comprises:
   bringing the ends of a strip of semi-crystalline support material together,
   fusing these ends together to form an endless support,
   post-crystallizing the fused ends, and
   applying an image-forming layer to the endless support, wherein prior to the application of the image-forming layer at least a part of the endless support containing the post crystallized used ends which is free of any image-forming layer stretched and heated at the same time to a temperature above the glass transition temperature of the support material.

2. The method according to claim 1, wherein after heating above the glass transition temperature and before the application of the image-forming layer, the support material is cooled to a temperature below the glass transition temperature of the support material.

3. The method according to claim 1, wherein the entire endless support is stretched.

4. The method according to claim 3, wherein the endless support is stretched over a drum having a radius slightly larger than the length L of the strip divided by $2\pi$.

5. The method according to claim 4, wherein the support is heated to a temperature above the glass transition temperature by placing a drum on which the endless support is applied in an oven.

6. The method according to claim 1, wherein the image-forming layer comprises a dielectric layer which is applied as a solution, whereafter the solvent is evaporated.

7. The method according to claim 1, wherein the image-forming layer comprises a metal layer which is applied to the surface of the endless support.

8. The method according to claim 1, wherein a polyester is used as the support material.

9. The method according to claim 8, wherein the polyester used as the support material is polyethyleneterephthalate.

* * * * *